US008908472B2

(12) United States Patent
Bull et al.

(10) Patent No.: US 8,908,472 B2
(45) Date of Patent: Dec. 9, 2014

(54) HEADS-UP NAVIGATION FOR SEISMIC DATA ACQUISITION

(75) Inventors: Andrew Bull, West Lothian (GB); Craig Williamson, East Lothian (GB); Martin C. Williams, Boulder, CO (US); Scott T. Hoenmans, Arvada, CO (US)

(73) Assignee: Inova Ltd., Grand Cayman (KY)

( * ) Notice: Subject to any disclaimer, the term of this patent is extended or adjusted under 35 U.S.C. 154(b) by 205 days.

(21) Appl. No.: 12/841,675

(22) Filed: Jul. 22, 2010

(65) Prior Publication Data

US 2011/0022306 A1 Jan. 27, 2011

Related U.S. Application Data (63) Continuation of application No. 11/760,078, filed on Jun. 8, 2007, now abandoned.

(60) Provisional application No. 60/812,540, filed on Jun. 9, 2006.

(51) Int. Cl.
G01V 1/00 (2006.01)
G01V 1/22 (2006.01)

(52) U.S. Cl.
CPC .. *G01V 1/003* (2013.01); *G01V 1/22* (2013.01)
USPC ................ 367/37; 367/14; 701/522; 701/526

(58) Field of Classification Search
CPC .................................. G01V 1/003; G01V 1/22
USPC .................. 367/56, 58, 77, 37; 702/188, 189; 345/633; 348/E7.087; 455/7; 701/202
See application file for complete search history.

(56) References Cited

U.S. PATENT DOCUMENTS 3,733,584 A 5/1973 Pelton et al.
3,806,864 A 4/1974 Broding et al.
(Continued)

FOREIGN PATENT DOCUMENTS

EP 0552769 A2 7/1993
WO WO9812577 A1 3/1998
(Continued)

OTHER PUBLICATIONS

408UL Reference Training Guide, Firmware Network Description, Jan. 13, 2000, pp. 13-1 to 13-18.

(Continued)

*Primary Examiner* — Daniel L Murphy
(74) *Attorney, Agent, or Firm* — Mossman, Kumar & Tyler, PC (57) ABSTRACT

A method and system for acquiring seismic data from a seismic survey plan is provided. A survey area is selected in which the seismic data will be acquired. A coordinate for at least one point of interest within the survey area is determined and input into a portable navigation device. A navigation solution is determined between a GPS-determined location of the portable navigation device and the determined coordinate and thereupon presented in a human cognizable media. A seismic device may be positioned at the determined coordinate to insonify a subterranean formation with seismic energy or for detecting reflected seismic energy. Data may be periodically entered into and retrieved from the portable navigation device by an in-field operator. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

17 Claims, 7 Drawing Sheets

(56) References Cited

U.S. PATENT DOCUMENTS

| | | | |
|---|---|---|---|
| 3,886,494 | A | 5/1975 | Kostelnicek et al. |
| 4,086,504 | A | 4/1978 | Ezell et al. |
| 4,236,234 | A | 11/1980 | McDavid et al. |
| 4,296,485 | A | 10/1981 | Clemens |
| 4,297,700 | A | 10/1981 | Nard et al. |
| 4,366,561 | A | 12/1982 | Klein |
| 4,628,494 | A | 12/1986 | Rialan et al. |
| 4,639,901 | A | 1/1987 | Warmack et al. |
| 4,644,506 | A | 2/1987 | Cretin et al. |
| 4,725,992 | A | 2/1988 | McNatt et al. |
| 4,807,200 | A | 2/1989 | Montes et al. |
| 4,814,711 | A | 3/1989 | Olsen et al. |
| 4,815,044 | A * | 3/1989 | Deconinck et al. ............. 367/77 |
| 4,815,944 | A | 3/1989 | Maruyama et al. |
| 4,885,724 | A | 12/1989 | Read et al. |
| 4,905,205 | A | 2/1990 | Rialan |
| 4,908,803 | A | 3/1990 | Rialan |
| 4,967,400 | A | 10/1990 | Woods |
| 4,979,152 | A | 12/1990 | Rialan et al. |
| 5,189,642 | A | 2/1993 | Donoho et al. |
| 5,206,835 | A | 4/1993 | Beauducel |
| 5,276,655 | A | 1/1994 | Rialan et al. |
| 5,351,244 | A | 9/1994 | Rialan et al. |
| 5,363,094 | A | 11/1994 | Staron et al. |
| 5,396,246 | A | 3/1995 | Coquerel |
| 5,481,502 | A | 1/1996 | Cretin et al. |
| 5,550,787 | A | 8/1996 | Rialan et al. |
| 5,563,847 | A | 10/1996 | Grouffal et al. |
| 5,617,371 | A | 4/1997 | Williams |
| 5,623,455 | A | 4/1997 | Norris |
| 5,627,798 | A | 5/1997 | Siems et al. |
| 5,681,008 | A | 10/1997 | Kinstler |
| 5,706,250 | A | 1/1998 | Rialan et al. |
| 5,724,241 | A | 3/1998 | Wood et al. |
| 5,745,074 | A | 4/1998 | Laude |
| 5,829,520 | A | 11/1998 | Johnson |
| 5,959,529 | A | 9/1999 | Kail, IV |
| 5,978,313 | A | 11/1999 | Longaker |
| 6,002,640 | A | 12/1999 | Harmon |
| 6,002,641 | A | 12/1999 | Chien |
| 6,023,444 | A | 2/2000 | Naville et al. |
| 6,061,299 | A | 5/2000 | Grouffal et al. |
| 6,070,129 | A | 5/2000 | Grouffal et al. |
| 6,078,283 | A | 6/2000 | Bednar |
| 6,208,247 | B1 | 3/2001 | Agre et al. |
| 6,208,626 | B1 | 3/2001 | Brewer |
| 6,219,620 | B1 | 4/2001 | Park et al. |
| 6,226,601 | B1 | 5/2001 | Longaker |
| 6,255,962 | B1 | 7/2001 | Tanenhaus et al. |
| 6,255,969 | B1 | 7/2001 | Crayford |
| 6,332,109 | B1 | 12/2001 | Sheard et al. |
| 6,353,577 | B1 | 3/2002 | Orban et al. |
| 6,430,106 | B1 | 8/2002 | Staron |
| 6,469,639 | B2 | 10/2002 | Tanenhaus et al. |
| 6,480,148 | B1 | 11/2002 | Wilson et al. |
| 6,553,316 | B2 | 4/2003 | Bary et al. |
| 6,560,565 | B2 * | 5/2003 | Roy et al. ...................... 702/188 |
| 6,898,529 | B2 | 5/2005 | Gao et al. |
| 6,944,096 | B2 | 9/2005 | Lemenager et al. |
| 6,977,867 | B2 | 12/2005 | Chamberlain |
| 7,034,711 | B2 | 4/2006 | Sakatani et al. |
| 7,050,355 | B2 | 5/2006 | Robertsson et al. |
| 2001/0030907 | A1 | 10/2001 | Bachrach |
| 2004/0037165 | A1 * | 2/2004 | Lemenager et al. ............ 367/37 |
| 2004/0156267 | A1 | 8/2004 | O'Brien et al. |
| 2004/0189675 | A1 * | 9/2004 | Pretlove et al. ............... 345/633 |
| 2004/0252585 | A1 | 12/2004 | Smith et al. |
| 2004/0257913 | A1 | 12/2004 | Ray et al. |
| 2005/0177310 | A1 | 8/2005 | Duncan et al. |
| 2005/0196985 | A1 | 9/2005 | Behn et al. |
| 2005/0276162 | A1 | 12/2005 | Brinkmann et al. |
| 2006/0086497 | A1 | 4/2006 | Ohmer et al. |
| 2006/0145881 | A1 | 7/2006 | Sakatani et al. |

FOREIGN PATENT DOCUMENTS

| | | |
|---|---|---|
| WO | WO9818022 A1 | 4/1998 |
| WO | WO9960424 A1 | 11/1999 |

OTHER PUBLICATIONS

SGR II, Seismic Group Recorder System: High technology with a track record., Global Universal Sciences, Inc., 1984, pp. 1-6.

SGR III, Seismic Group Recorder System, Global Universal Sciences, Inc., 1985, pp. 1-4.

LRS Quarterly, vol. 1, Issue 3, May 12, 2003.

\* cited by examiner

HEADS-UP NAVIGATION FOR SEISMIC DATA ACQUISITION

CROSS-REFERENCE TO RELATED APPLICATIONS

This application is a continuation of U.S. patent application Ser. No. 11/760,078, filed Jun. 8, 2007, which claims the benefit of priority to U.S. Provisional application 60/812,540, filed on Jun. 9, 2006, both of which are hereby incorporated herein by reference in their entirety.

BACKGROUND OF THE DISCLOSURE

Oil companies conduct seismic surveying to lower risk and to reduce costs of locating and developing new oil and gas reserves. Seismic surveying is, therefore, an up front cost with intangible return value. Consequently minimizing the cost of seismic surveying and getting quality results in minimum time are important aspects of the seismic surveying process.

Seismic surveys are conducted by deploying a large array of seismic sensors over a surface portion of the earth. Typically, these arrays cover 50 square miles and may include 2000 to 5000 seismic sensors. An energy source (buried dynamite for example) is discharged within the array and the resulting shock wave is an acoustic wave that propagates through the subsurface structures of the earth. A portion of the wave is reflected at underground discontinuities, such as oil and gas reservoirs. These reflections are then sensed at the surface by the sensor array and recorded. Such sensing and recording are referred to herein as seismic data acquisition, which might also be performed in a passive mode without an active seismic energy source. A three dimensional map, or seismic image, of the subsurface structures is generated by moving the energy source to different locations while collecting data within the array. This map is then used to make decisions about drilling locations, reservoir size and pay zone depth.

During use of seismic data acquisition systems, which involve the stages of layout, shooting, and retrieval, the current technologies require a "heads down" approach to navigate a terrain underlying the seismic spread. That is, the field crew must continually reference a handheld device to determine their location. If the crew has difficulty finding the location, time-consuming radio calls are made to the main survey station for instructions. Moreover, radio contact is frequently interrupted or inaccessible, further delaying the process.

The present disclosure addresses these and other shortcomings of conventional seismic data acquisition systems.

SUMMARY OF THE DISCLOSURE

The present disclosure provides systems and methods for acquiring seismic data from a seismic survey plan. One aspect of the present disclosure provides a method for acquiring seismic data, including: selecting a survey area in which the seismic data will be acquired; determining a coordinate for at least one point of interest within the survey area; inputting the determined coordinate into a portable navigation device; determining a navigation solution between a determined location of the portable navigation device and the determined coordinate; and presenting the determined navigation solution in a human cognizable media. In one aspect, the at least one point of interest is a location for a seismic device. The method further provides positioning the seismic device at the determined coordinate. In one aspect the seismic device includes a seismic source, and the method further includes activating the seismic source to insonify a subterranean formation with seismic energy. In another aspect, the seismic device is a sensor station, and the method further includes detecting reflected seismic energy at the sensor station. The seismic device may be retrieved from the location. The method further includes periodically entering data into the portable navigation device, the data representing at least one of: (i) a status of the mobile unit, (ii) a terrain characteristic, (iii) a topography characteristic, (iv) a characteristic of the coordinate, and (v) an image of a surrounding terrain. Also, data may be retrieved from the portable navigation device representing at least one of: (i) a status of a mobile unit, (ii) a terrain characteristic, (iii) a topography characteristic, (iv) a characteristic of the coordinate, and (v) an image, while retrieving a selected device. The determined coordinate may be associated with a location of one of: (i) a sensor station, (ii) a seismic source, (iii) a rendezvous point, (iv) a mobile unit, and (v) a power supply. In one aspect, the determined location may be obtained from a Global Positioning Satellite (GPS) device.

In another aspect, the present disclosure provides a system for acquiring seismic data which includes: a database configured to contain data associated with a survey plan, the data containing at least one coordinate associated with a point of interest; a computer configured to access the database; a portable navigation device configured to receive the at least one coordinate from the computer; a device configured to determine a location of the portable navigation device; a processor configured to determine a navigation solution from the determined location and the at least one coordinate; and a presentation device configured to present the determined navigation solution in a human cognizable media. In one aspect, the data further contains a plurality of coordinates, each of which is associated with a seismic device. The portable navigation device may include a memory module configured to receive data relating to at least one of: (i) a status of a mobile unit, (ii) a terrain characteristic, (iii) a topography characteristic, (iv) a characteristic of the coordinate, and (v) an image of a surrounding terrain. The determined coordinate may be associated with one of: (i) a sensor station, (ii) a seismic source, (iii) a rendezvous point, (iv) a mobile unit, and (v) a power supply. In one aspect, the device for determining the location of the portable navigation device is a Global Positioning Satellite (GPS) device.

In another aspect, the present disclosure provides a computer-readable medium containing a computer program that when executed by a processor performs a method for guiding a mobile unit in a geographical area of interest. The computer program includes instructions to instructions to obtain a location for at least one seismic device from a survey plan database; instructions to obtain a location of the mobile unit from a location sensor carried by the mobile unit; instructions to determine a navigation solution for guiding the mobile unit to the at least one seismic device; and instructions to send the navigation solution to an output device to present the navigation solution in a human cognizable media. In one aspect, the computer-readable medium also includes instructions to obtain coordinates related to the mobile unit from a Global Positioning Satellite (GPS) device. In another aspect, the computer-readable medium includes instructions to obtain from a knowledge database geographical data related to at least one of: (i) legal boundaries; (ii) transit routes; (iii) a layout of a seismic spread; (iv) crew schedules; (iv) preset rendezvous points; (v) support areas. In another aspect, the survey plan database includes one of: (i) a GIS database; and (ii) a historical seismic survey database. In another aspect the output device includes one of a visual display and an audio speaker.

It should be understood that examples of the more important features of the disclosure have been summarized rather broadly in order that detailed description thereof that follows may be better understood, and in order that the contributions to the art may be appreciated. There are, of course, additional features of the disclosure that will be described hereinafter and will form the subject of the claims appended hereto.

BRIEF DESCRIPTION OF THE DRAWINGS

The novel features of this disclosure, as well as the disclosure itself, will be best understood from the attached drawings, taken along with the following description, in which similar reference characters refer to similar parts, and in which.

DETAILED DESCRIPTION OF THE DISCLOSURE

In aspects, the present disclosure relates to devices and methods for controlling activities relating to seismic data acquisition. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

Figure 1:
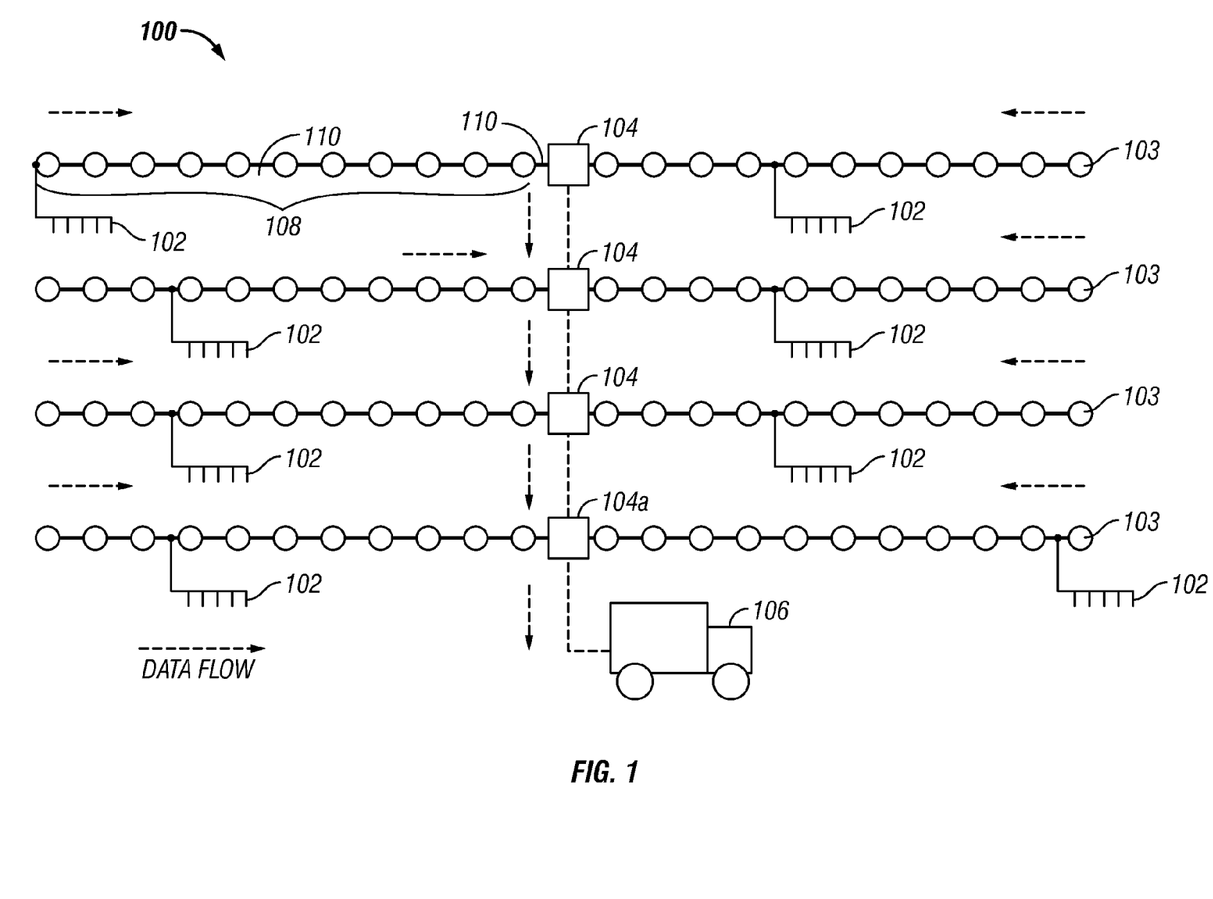
FIG. 1 schematically illustrates one cable-based seismic data acquisition system that may be deployed with embodiments of the present disclosure.

FIG. 1 depicts a cable-based seismic data acquisition system 100. The system 100 includes an array (string) of spaced-apart seismic sensor units 102. Each string of sensors is typically coupled via cabling to a data acquisition device (field box) 103, and several data acquisition devices and associated string of sensors are coupled via cabling 110 to form a line 108, which is then coupled via cabling 110 to a line tap or (crossline unit) 104. Several crossline units and associated lines are usually coupled together and then to a central controller 106 housing a main recorder (not shown). The typical sensor unit 102 in use today is a velocity geophone used to measure acoustic wave velocity traveling in the earth. Recently, and as noted above, acceleration sensors (accelerometers) are finding more widespread acceptance for measuring acceleration associated with the acoustic wave. Each sensor unit might include a single sensor element or more than one sensor element for multi-component seismic sensor units. The sensors 102 are usually spaced at least on the order of tens of meters, e.g., 13.8-220.0 feet. Each of the crossline units 104 typically performs some signal processing and then stores the processed signals as seismic information for later retrieval as explained above. The crossline units 104 are each coupled, either in parallel or in series with one of the units 104a serving as an interface with between the central controller 106 and all crossline units 104.

Figure 2:
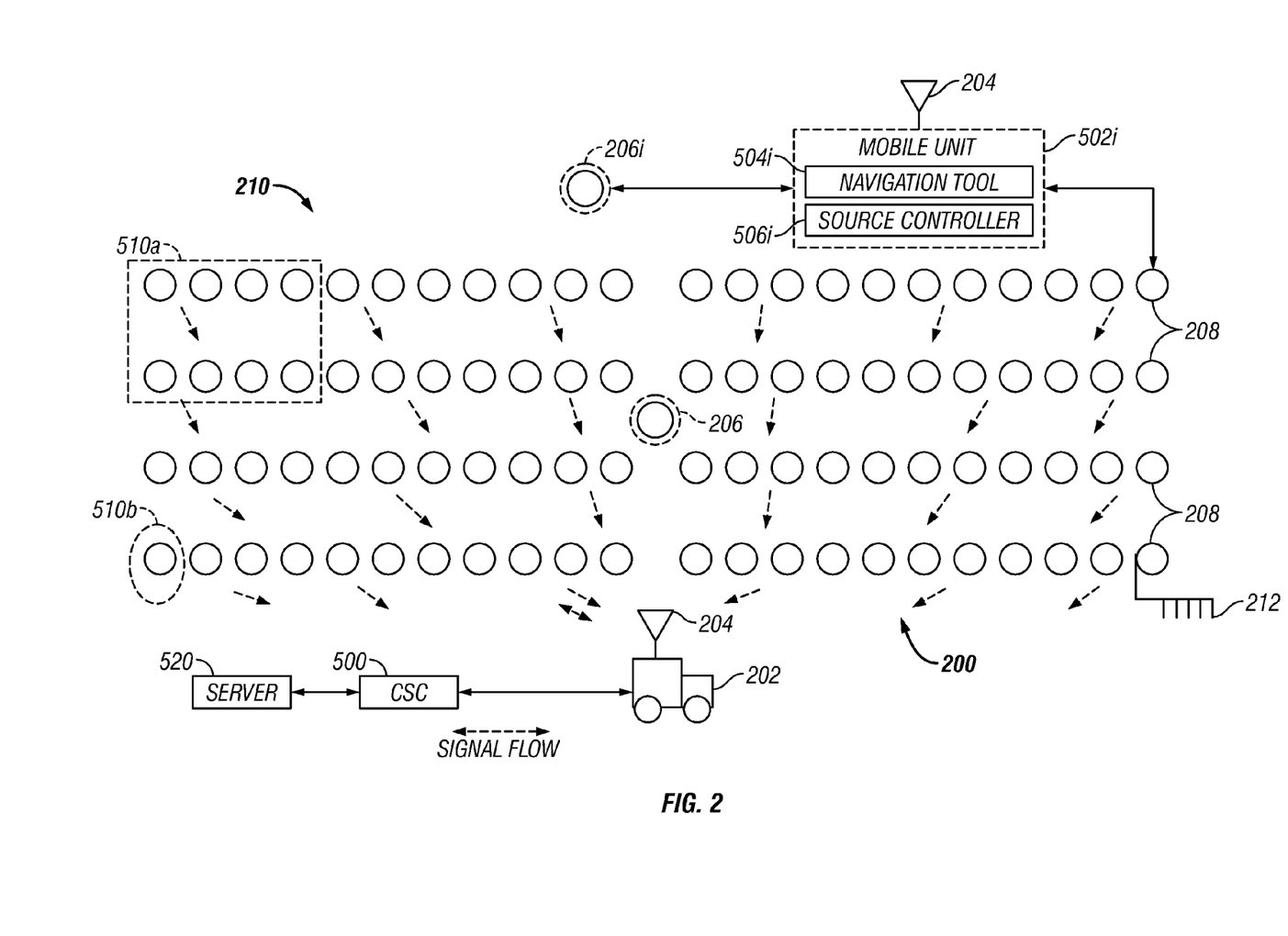
FIG. 2 is a conceptual representation of a wireless seismic data acquisition system that may be deployed with embodiments of the present disclosure.

Referring initially to FIG. 2 there is shown one seismic survey data acquisition system that utilizes wireless communication technology. The system 200 includes a central controller 202 in direct communication with each of a number of wireless sensor stations 208 forming an array (spread) 210 for seismic data acquisition. Each sensor station 208 includes one or more sensors 212 for sensing seismic energy. Direct communication as used herein refers to individualized data flow as depicted in FIG. 2 by dashed arrows. The data flow can be bi-directional to allow one or more of: transmitting command and control instructions from the central controller 202 to each wireless sensor station 208; exchanging quality control data between the central controller 202 and each wireless sensor station 208; and transmitting status signals, operating conditions and/or selected pre-processed seismic information from each wireless sensor station 208 to the central controller 202. The communication might be in the form of radio signals transmitted and received at the central controller 202 via a suitable antenna 204. The system 200 may operate in a passive mode by sensing natural or random seismic energy traveling in the earth. The term "seismic devices" means any device that is used in a seismic spread, including, but not limited to, sensors, sensor stations, receivers, transmitters, power supplies, control units, etc.

The system 200 may operate in an active mode using a seismic energy source 206, e.g., pyrotechnic source, vibrator truck, compressed gas, etc., to provide seismic energy of a known magnitude and source location. In many applications, multiple seismic energy sources can be utilized to impart seismic energy into a subterranean formation. A representative seismic energy source is designated with numeral 206i. Typically, activation (or more commonly, "shooting" or "firing") of the source 206i is initiated locally by a mobile unit 502i. In one embodiment, the mobile unit 502i includes a human operator who may utilize a navigation tool 504i to navigate to a source 206i and a source controller 506i to fire the source 206i. To navigate the terrain and to determine precise location coordinates, the navigation tool 504i can be equipped with a global positioning satellite device (GPS device) and/or a database having predetermined coordinates (e.g., z coordinates). It should be understood that a GPS device is merely illustrative of sensors that may be utilized to determine a position or location of a device or point of interest. Other devices may include inertial navigation devices, compasses, the Global Navigational Satellite System (GNSS), or suitable system for obtaining position or location parameters. The navigation tool 5141 can also be configured to provide audible or visual signals such as alarms or status indications relating to the firing activity. The source controller 506i can be programmed to receive or transmit information such as instructions to ready the source 206i for firing, instructions or permission to fire the source 206i, data indicative of the location of the mobile unit 502i, the arming status of the source 206i, and data such as return shot attributes. The source controller 506i can also be programmed to fire the source 206i and provide an indication (e.g., visual or auditory) to the human operator as to the arming status of the source 206i. Often, two or more mobile units 502i independently traverse the terrain underlying the spread 210 to locate and fire the sources 206*i*. In one configuration, the source controller 506*i* relies on the navigation tool 504*i* to transmit the GPS data to the controller 202 or central station computer 500 (described below), either of which transmit the "arm" and "fire" signals to the source controller 506*i*. These signals are digital signals or suitable analog signals in contrast to the voice signals currently in use. The source controller 506*i* can include a display to advise the shooter of the status of the firing activity.

The controller 202, the central station computer (CSC) 500 and a central server 520 exert control over the constituent components of the system 200 and direct both human and machine activity during the operation of the system 200. As discussed in greater detail below, the CSC 500 automates the shooting of the sources 206*i* and transmits data that enables the sensor stations 208 to self-select an appropriate power usage state during such activity. The server 520 can be programmed to manage data and activities over the span of the seismic campaign, which can include daily shooting sequences, updating the shots acquired, tracking shooting assets, storing seismic data, pre-processing seismic data and broadcasting corrections. Of course, a single controller can be programmed to handle most if not all of the above described functions. For example, the CSC 500 can be positioned in or integral with the controller 202. Moreover, in some applications it may be advantageous to position the controller 202 and CSC 500 in the field, albeit in different locations, and the server 520 at a remote location.

Figure 3A:
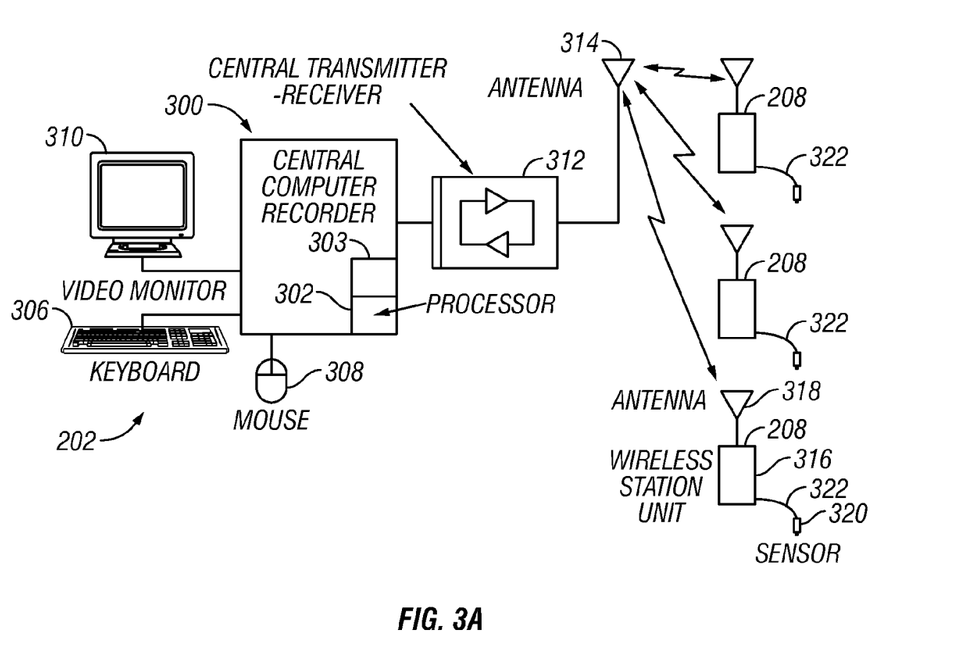
FIG. 3A shows a schematic representation of the system of FIG. 2 in more detail.

FIG. 3A is a schematic representation of the system 200 in more detail. The central controller 202 includes a computer 300 having a processor 302 and a memory 303. An operator can interface with the system 200 using a keyboard 306 and mouse or other input 308 and an output device such as a monitor 310. Communication between remotely-located system components in the spread 210 and the central controller 202 is accomplished using a central transmitter-receiver (transceiver) unit 312 disposed in the central controller 202 along with an antenna 314.

Figure 3B:
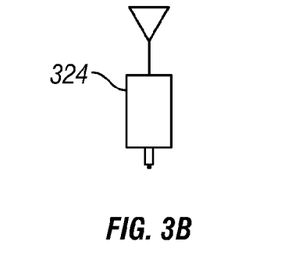
FIG. 3B shows one embodiment of a wireless station unit having an integrated seismic sensor.

The central controller 202 communicates with each wireless sensor station 208. Each wireless sensor station 208 shown includes a wireless station unit 316, an antenna 318 compatible with the antenna 314 used with the central controller 202, and a sensor unit 320 responsive to acoustic energy traveling in the earth co-located with a corresponding wireless sensor station. Co-located, as used herein, means disposed at a common location with one component being within a few feet of the other. Therefore, each sensor unit 320 can be coupled to a corresponding wireless station unit by a relatively short cable 322, e.g., about 1 meter in length, or coupled by integrating a sensor unit 320 with the wireless station unit 316 in a common housing 324 as shown in FIG. 3B.

Figure 4:
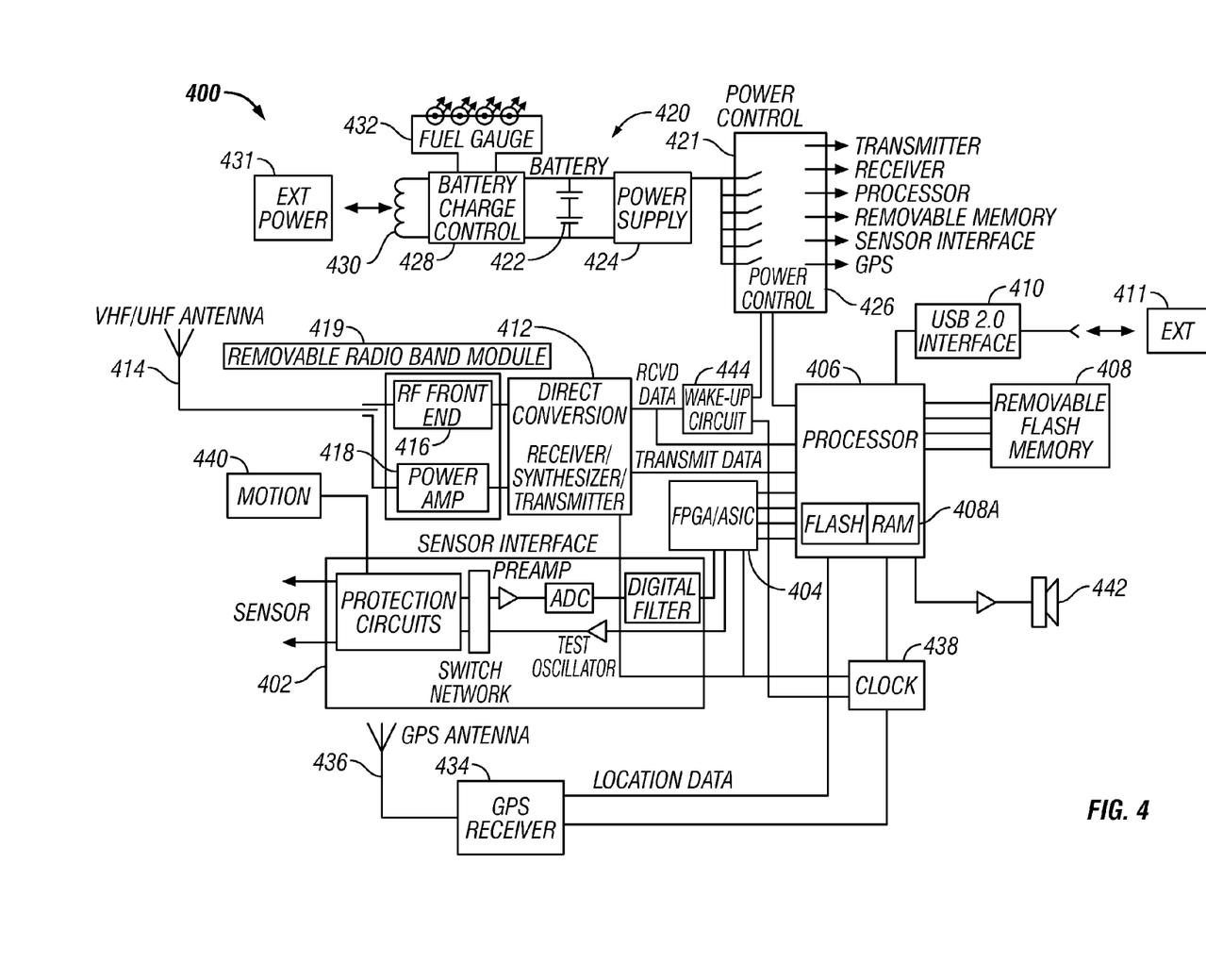
FIG. 4 is a schematic representation of a wireless station unit according to the present disclosure incorporating circuitry to interface with an analog output sensor unit.

FIG. 4 is a schematic representation of a wireless station unit 400 according to the present disclosure that operates as a data recorder incorporating circuitry to interface with an analog output sensor unit (not shown). In other embodiments, the wireless station unit 400 can incorporate circuitry to interface with a digital output sensor unit as discussed in co-pending and commonly assign U.S. patent application Ser. No. 10/664,566 which is hereby incorporated by reference for all purposes. The wireless station unit 400 is an acquisition device that includes a sensor interface 402 to receive an output signal from the sensor unit. The sensor interface 402 shown includes a protection circuit, switch network, a preamplifier, a test oscillator, and ADC and digital filtering circuits to pre-process the received signal. The sensor interface 402 is controlled in part by a field programmable gate array (FPGA) and/or an ASIC controller circuit 404. An on-board local processor 406 processes the signal to create storable information indicative of the seismic energy sensed at the sensor unit. The information can be in digital form for storage in a storage device 408, also referred to herein as a memory unit. The memory unit can be removable as shown at 408 and/or dedicated 408*a* with a coupling 410 for providing access to the stored information and/or for transferring the stored information to an external storage unit 411. The coupling 410 might be a cable coupling as shown or the coupling might be an inductive coupling or an optical coupling. Such couplings are known and thus are not described in detail.

The memory 408, 408*a* can be a nonvolatile memory of sufficient capacity for storing information for later collection or transmission. The memory might be in the form of a memory card, removable miniature hard disk drive, an Electrically-Erasable Programmable Read Only Memory (EEPROM) or the like.

Interface with the central controller 202 is accomplished with a communication device such as an on-board transmitter-receiver circuit 412, and an antenna 414 selected for the desired transmitting/receiving frequency to provide direct communication with the remotely-located central controller 202. The transmitter/receiver circuit 412 shown is a direct conversion receiver/synthesizer/transmitter circuit and can alternatively be implemented as a software defined radio transceiver. Alternatively, the transmitter/receiver circuit 412 might be any suitable circuit providing transceiver functions such as a transceiver utilizing superheterodyne technology, for example. The antenna 414 can include a VHF/UHF antenna. Other circuitry might include a radio frequency (RF) front end circuit 416 and a power amplifier 418 for enhancing communication with the central controller 202. These circuits might advantageously be in the form of a removable radio band module 419 to allow operation over a broad frequency band when used with replaceable antennas. A direct conversion radio transceiver provides the advantages of operation over a broad frequency band, allows smaller overall size for the station unit 400, and reduces overall weight for field-transportable units.

Local power is provided by a power supply circuit 420 that includes an on-board rechargeable battery 422. The battery 422 might be of any suitable chemistry and might be nickel-metal hydride (NMH), a lithium-ion or lithium-polymer rechargeable battery of adequate size for the particular application. The battery provides an output to a power supply 424 to condition and regulate power to downstream circuits and the power supply output is coupled to a power control circuit 426 for distributing power to various local components. The wireless station unit 400 also includes power management circuitry 421 that shifts the station unit 400 between one or more selected levels of power use: e.g., a sleep mode wherein only the "wake" circuitry is energized to a high-active mode wherein the receiver can detect seismic energy.

The power circuit 420 further includes a charging device 428 and charger interface 430 for coupling the charging device 428 to an external power source 431. A charge indicator 432 provides an indication of amount of charge and/or charging time remaining for the power circuit 420. Such indicators are somewhat common and further description is not necessary here.

Location parameters (e.g., latitude, longitude, azimuth, inclination, etc.) associated with a particular wireless sensor station help to correlate data acquired during a survey. These parameters determined prior to a survey using an expected sensor location and nominal sensor orientation and the parameters can be adjusted according to the present disclosure. The location parameters are stored in a memory 303, 408 either in the central controller or in the station unit 400. In one embodiment, the wireless sensor station includes a global positioning system (GPS) receiver 434 and associated antenna 436. The GPS receiver in this embodiment is shown coupled to the processor 406 and to a clock circuit 438 to provide location parameters such as position and location data for correlating seismic information and for synchronizing data acquisition. Alternatively, location parameters can be transmitted to and stored in the central controller and synchronization may be accomplished by sending signals over the VHF/UHF radio link independent of the GPS. Therefore, the on-board GPS can be considered an optional feature of the disclosure. Location parameters associated with sensor orientation can be determined by accelerometers and/or magnetic sensors and/or manually.

In one embodiment, a wake up circuit 444 allows the wireless station unit to control power consumption from the battery throughout different operating modes. The wake up circuit 444 can be triggered from two sources; the radio receiver 412 or the clock 438. In a low power mode, for example, power is applied only to the radio receiver 412 and the wake up circuit 444. If a specific wake-up command is transmitted over the radio and decoded by the wake-up circuit, other circuits such as the processor 406 will be enabled and come on-line to support further processing of commands and signals received from the sensor unit. Alternatively the wake-up circuit could energize the radio receiver 412 at predetermined time intervals as measured by signals received from the clock 438. At these intervals the radio receiver would be enabled briefly for receiving commands, and if none are received within the enabled time period, the receiver 412 will power down, either autonomously or by command from the wake up circuit.

In one embodiment, the function of motion sensing is accomplished with the same sensor unit 208 as is performing the seismic energy sensing function. In the embodiment described above and referring to FIG. 3B having the sensor unit integrated into the wireless station unit, the seismic sensor output will necessarily include components associated with the desired sensed seismic activity as well as sensed components associated with unwanted movement. The output is processed in conjunction with the output signal from the GPS receiver to indicate unwanted station movement. Thus, an output signal transmitted to the central controller 202 might include information relating to unwanted movement as well as seismic information, state of health information or other information relating to a particular wireless station unit 316 and/or sensor unit 320.

In several alternative embodiments, methods of the present disclosure are used to sense, record and transfer information from a seismic sensor location to a central recorder. In one embodiment, a wireless station unit substantially as described above and shown in FIG. 4. Each wireless sensor station is transported to a predetermined spread location. Upon arriving at the location, viability of the location is determined in real time based on the terrain, obstacles borders etc. The location is adjusted where necessary and feasible. If adjusted, location parameters (e.g., latitude, longitude, azimuth, inclination, etc.) associated with the particular wireless sensor station so adjusted are determined and entered as updated system parameters. In one embodiment, these parameters are determined using a GPS receiver to determine the actual location of the planted sensor unit. Other parameters might be determined with a manual compass used by the crew or by one or more magnetometers in the sensor unit. Parameters might also be determined using multi-component accelerometers for determining orientation of the planted sensor unit. In one embodiment the updated system parameters are entered by the field crew in the wireless sensor station unit itself. In one embodiment, the updated system parameters are entered at the central controller. In another embodiment, the updated system parameters are entered automatically upon system activation and sensor station wake-up using location parameters and orientation parameters determined by a GPS receiver, accelerometers, magnetometers, and/or other sensors disposed in the station or sensor unit or both.

Referring to FIGS. 2-4, the wireless system 200 includes a central controller 202 remotely located from a plurality of station units 208. Each station unit 208 includes a sensor unit 320 remotely located from the central controller 202. Each sensor unit 320 is coupled to the earth for sensing seismic energy in the earth, which might be natural seismic energy or energy produced from a seismic source 206. The sensor unit 320 provides a signal indicative of the sensed seismic energy and a recorder device 316 co-located with the sensor unit receives the signal stores information indicative of the received signal in a memory unit 408 disposed in the recorder device 316. A communication device 412 is co-located with the sensor unit and the recorder device for providing direct two-way wireless communication with the central controller.

During the various stages of deploying the seismic acquisition data system shown in FIGS. 1-4, as well as other conventional seismic data acquisition systems, the human operators making up a seismic survey crew are typically required to (i) place the field equipment in the correct location then (ii) be able to quickly and safely locate that equipment at any time. The present disclosure provides methods and devices that guide a human operator to a specified position or coordinate for each seismic survey source, sensor station or other device during layout and to guide the human operator back to each device's location during "shooting," retrieval, field repair or replacement, etc.

Figure 5:
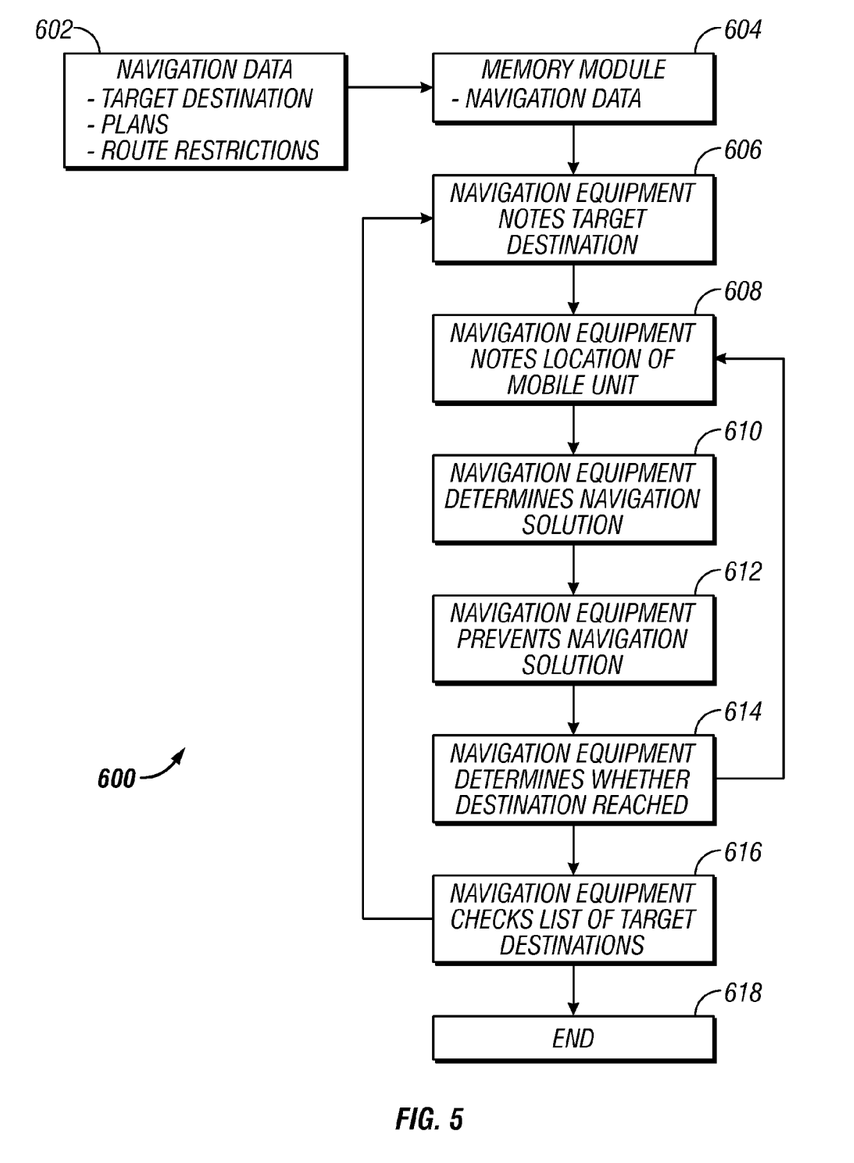
FIG. 5 is a flowchart representing one exemplary heads-up navigation method according to the present disclosure.

Referring now to FIGS. 2 and 5, there is shown one exemplary method 600 for guiding a mobile unit 502i, typically a human operator, to a selected coordinate. At step 602, a set of navigation data is collected or assembled. The term "navigation data" includes any data that could be used to guide the human operator to a target location. Exemplary navigation data includes, but is not limited to: the target coordinates (e.g., X, Y and/or Z coordinates) of seismic devices such as sensor stations 208, sources 206i, power supplies (not shown); data relating to the topography or other geographical feature of the terrain to be traversed by the mobile unit 502i; data relating to the legal boundaries; data relating to preferred transit routes or corridors of travel; data relating to the layout of the seismic spread; data relating to crew activities, work plans, and schedules; data relating to preset rendezvous points; and data relating to support areas such as supply depots, hospitals, shelters, landing sites, etc. At step 604, the navigation data is loaded into a memory module that can be accessed by an appropriately programmed processor such as a navigation tool 208i. At step 606, the processor accesses the memory module to select a target destination. In some embodiments, the target destination or the coordinates of the target destination is preprogrammed in the navigation data. In other embodiments, the target destination or the coordinates of the target destination are received from a source other than the memory module, e.g., a separate processor, another mobile unit or a remotely located GPS device. At step 608 the processor determines the current location of the mobile unit 502i in the field. At step 610, the processor determines a navigation solution using the determined mobile unit location, the location of the target destination, and any addition information in the navigation data such as route restrictions, preferred paths, expected hazards, etc. At step 612, the processor provides the mobile unit 502*i* with a navigation solution that guides the mobile unit 502*i* to the target destination. By navigation solution, it is meant a signal that contains an instruction that initiates and/or controls movement of the human operator. For example, a navigation solution can be a signal that is understood to mean "maintain current direction," "turn left" or "turn right," etc. The navigation solution can also include proximity information such as "near" or "far". Thus, a human operator by complying with the navigation solution can reach the target location or coordinate without having to independently ascertain which direction to proceed to reach the target coordinate. Of course, some human analysis may be needed to circumvent unexpected hazards or obstacles, but such analysis is performed in an effort to comply with the navigation solution. At step 614, the processor determines whether another navigation solution is needed. For example, this determination can be based on a preset radius of proximity of a mobile unit 502*i* to a target location. If the processor determines that the target location has not been reached, then the processor returns to step 608. If the processor determines at step 614 that the target coordinate has been reached, then at step 616 the processor determines whether any target destinations remain. If additional target destinations remain, then the processor returns to step 606. If there are no additional target destinations, then the method ends at step 618. As can be appreciated, the navigation solution can be updated continuously, periodically, upon prompting, or on a preset schedule.

The method 600 can be used during any phase of the seismic data acquisition activity; including, initial surveying of a geographical area, placing seismic devices such as sensor stations and sources, guiding a human operator to a seismic source to shoot sources, and retrieving the seismic devices. Further, the method 600 can be employed for tasks other than locating seismic devices. For example, target destinations can include a hospital, a supply depot, a rendezvous point, a shelter, another mobile unit, office buildings, a roadway, or any other location or destination that a human operator or crew member may seek for any reason.

It should be appreciated that by utilizing the above-described methodology, human operators can steadily move toward the destination while keeping their heads up and their eyes on the desired path. This is possible because the human operator does not have to determine a navigation solution in-situ. That is, the human operator does not have to consult a map, a GPS device or other navigation aid to ascertain a course or direction to a target coordinate. Rather, as explained above, this navigation solution is automatically calculated and provided to the human operator in a manner that does not impair the human operator's visual contact with the terrain. Thus, delays caused by referencing a map and/or handheld device and the time and effort required to get a crew to an assigned position can be significantly reduced. Moreover, looking forward enables crew members to see potential hazards as they near them.

Figure 6:
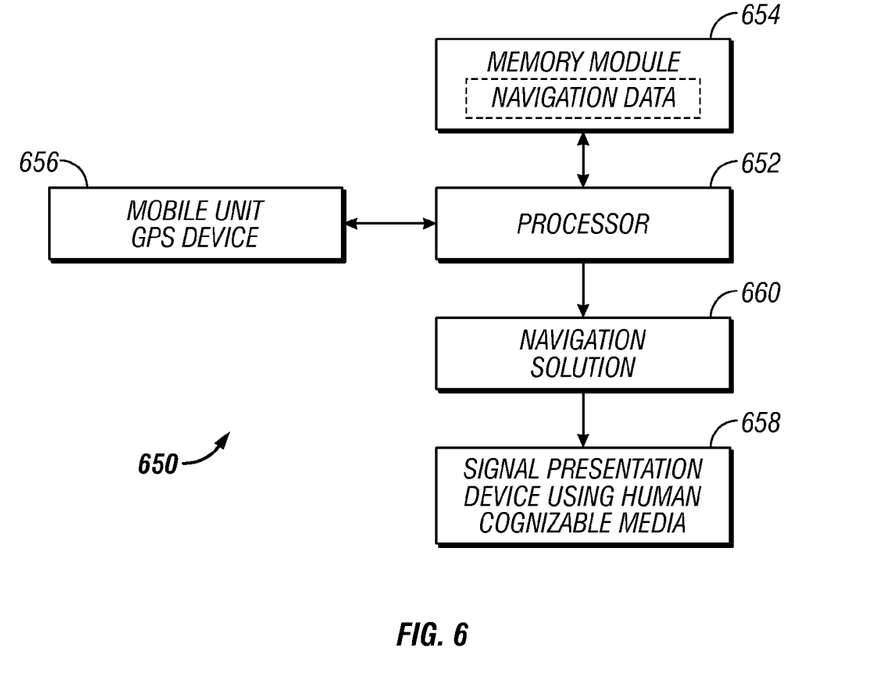
FIG. 6 is a schematic presentation of an exemplary heads-up navigation device according to the present disclosure.

Referring now to FIGS. 2 and 6, there is shown one embodiment of a "heads up" navigation device 650 made in accordance with the present disclosure that presents a navigation solution to a human operator. The navigation device 650 includes a processor that communicates with a memory module 654 loaded with navigation data, a GPS device 656 that provides location coordinates for the human operator, and with a presentation device 658 that presents a navigation solution 660 in a human cognizable media to the human operator. The processor 652 can be in the navigation tool 504*i* carried by the human operator. Alternatively, the processor 652 can be positioned in a central controller 202 or even a remote server 520. The processor 652 can include a suitable transceiver to provide a communication link. Suitable communication media include wireless transmissions as well as wire media. The processor 652 is programmed with executable instructions that calculate a navigation solution using a location of the human operator as determined by the GPS device 656 and the target coordinate. In some embodiments, the target coordinate(s) are preprogrammed into the navigation data of the memory module 654. In other embodiments, the target coordinate(s) can be retrieved by a suitably positioned GPS device (not shown) at a selected target location. The memory module 654 can include computer-readable media such as hard drives, flash drives, CD-ROM, ROM, RAM and other such media. As discussed previously, the navigation data can include any data that could be displayed, processed or otherwise utilized to formulate a navigation solution that guides the human operator to a target coordinate.

The presentation device 658 can present the navigation solution 660 to the human operator such that the human operator maintains visual contact with a terrain being traversed. In some embodiments, the presentation device 658 employs a human cognizable media to convey the navigation solution 600 to the human operator. One suitable cognizable media is visual signals. Exemplary devices for presenting a visual signal include helmet mounted single eye-piece displays, visor-type single eye-piece displays, eyewear enabling displays for both eyes, and vehicle projection displays. Such displays can include near-eye occluded displays, "real screen" rear projected displays, and substantially transparent screens that display the determined navigation solution. A visual presentation device 658 can conveniently display pertinent information on a survey, e.g., topography, boundaries, equipment location, etc., as well as navigate to a point via mobile visual displays. Furthermore, robust digital displays in vehicles or on wearable headgear can indicate boundaries, restrictions, and hazards before they come into sightline. Suitable displays can also be used on vehicle windshields for vehicle guidance. Another human cognizable media are audio signals. Exemplary devices for presenting an audio signal encoded with the determined navigation solution include ear phones, head sets or surround sound helmets. The audio signal can employ several data encoding formats schemes to convey the navigation solution to the human operator, including, but not limited to, frequency variation, volume variation, tone variation, period variation, and pitch variation.

Figure 7:
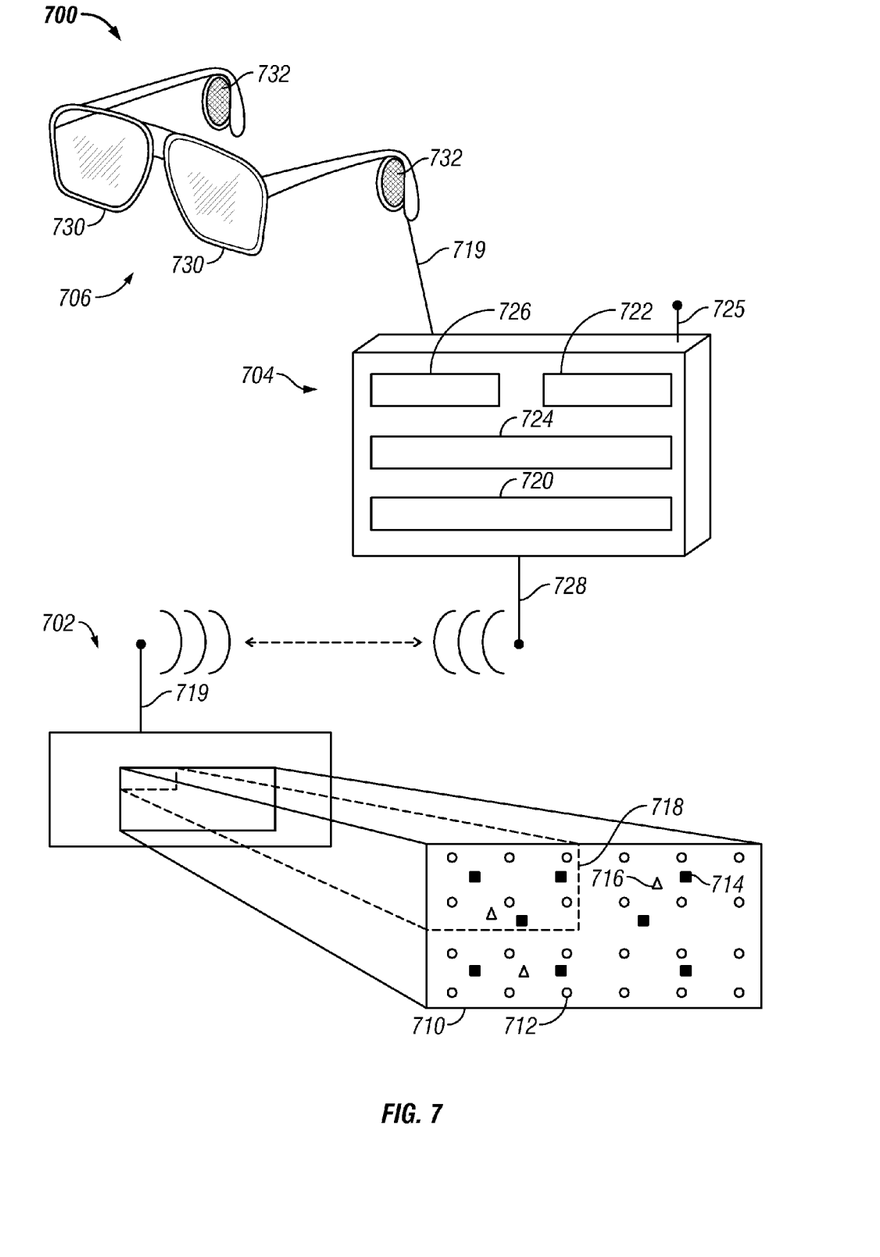
FIG. 7 shows an exemplary integrated navigation system for providing a navigation solution to an in-field operator.

FIG. 7 illustrates an exemplary integrated navigation system 700 for providing a navigation solution to an in-field operator. The navigation system includes a central computer 702 providing a database representing a survey area, a portable navigation device 704 in wireless communication with the central computer for receiving a portion of the survey area and for providing a navigation solution over the received portion, and a presentation device 706 to present the navigation solution to the operator in a human cognizable format.

The central computer 702 includes a database representative of a survey area 710. The database includes location information such as x- and y-coordinates, for example, of sensor stations 712 and seismic sources 714. Additional items of interest 716 may include a home base, a first aid station, a river, etc. which may also be represented in the database. The central computer 702 may also include data used to manage activities over the span of the seismic campaign, which can include daily shooting sequences, shooting assets, historical data, seismic data from previous seismic campaigns, GIS information, etc. A geographic information system (GIS) is a system for capturing, storing, analyzing and managing data and associated attributes which are spatially referenced to the earth. The central computer is in communication with the portable navigation device via a wireless link established by antenna 719. In one aspect, the central computer may provide the navigation device with a selected portion 718 of the survey area.

The portable navigation device 704 includes a memory 720 for storing the received portion of the survey area, a location module such as a GPS module 722 for providing a current location of the operator, and a processor 724 for determining a navigation solution between the current location and a selected destination location in the received portion of the survey area. In one aspect, the processor provides a straight-line navigation between the current location and the selected destination location. In another aspect, the processor provides a navigation solution taking into consideration various aspects of the survey area, such as rough or private property, difficult terrain, including rivers, ponds, precipitous mountainsides, etc. Antenna 728 provides a wireless communication link to the central computer. Antenna 725 receives location information, such as GPS information, from a location sensor, such as a GPS system, to the portable navigation device. The navigation device further includes presentation electronics 726 for converting a navigation solution into a form presentable to a human operator.

The portable navigation device further includes a computer-readable medium containing a computer program that can be executing by the processor to perform several instructions to guide a mobile unit in a geographical area of interest. The instructions include: obtaining a location for at least one seismic device from a survey plan database; obtaining a location of the mobile unit from a location sensor carried by the mobile unit; determining a navigation solution for guiding the mobile unit to the at least one seismic device; and sending the navigation solution to an output device to present the navigation solution in a human cognizable media. Coordinates related to the mobile unit may be obtained, for example, from a Global Positioning Satellite (GPS) device or other suitable positioning device. The geographical data may be obtained from a knowledge database and may include information that relates to at least one of: (i) legal boundaries; (ii) transit routes; (iii) a layout of a seismic spread; (iv) crew schedules; (iv) preset rendezvous points; (v) support areas. The survey plan database may include a GIS database, a historical seismic survey database, or other related databases. The output device includes the presentation device 706 which includes a visual display 730 and an audio speaker 732.

The presentation device 706 may include a visual display such as a set of glasses 730 and can be worn by the operator having electronic circuitry for presenting the visual display of the navigation solution. The presentation device may also include audio speakers such as the set of earphones 732 to provide an audio presentation of the navigation solution. The presentation device is generally in communication with the portable navigation system via an electrical wire 729.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

What is claimed is:

1. A method of conducting a seismic survey, comprising:
    programming a central controller with data relating to a survey plan;
    retrieving a selected portion of data on a database with a portable navigation tool,
        wherein the data includes at least one coordinate associated with each of a plurality of seismic devices;
    carrying the portable navigation tool into a region of interest by using a human operator;
    determining a navigation solution using the portable navigation tool for each of the plurality of seismic devices, wherein the navigation solution is between a location of the portable navigation tool and a location of each of the plurality of seismic devices;
    presenting the navigation solutions in a human cognizable medium to a human operator;
    navigating the human operator to each of the at least one coordinates associated with each of the plurality of seismic devices using the portable navigation tool as the human operator carries the portable navigation tool;
    adjusting a location of at least one of the plurality of seismic devices;
    updating the central controller with a location parameter for the adjusted location; and
    communicating with at least one seismic device of the plurality of seismic devices using the portable navigation tool, wherein the communication is bi-directional.

2. The method of claim 1, further comprising, transporting the plurality of seismic devices to a point of interest.

3. The method of claim 1, further comprising retrieving each of the plurality of seismic devices.

4. The method of claim 1, further comprising periodically entering data into the portable navigation tool, data representing at least one of: (i) a terrain characteristic, (ii) a topography characteristic, and (iii) an image of a surrounding terrain.

5. The method of claim 4, further comprising retrieving data from the portable navigation tool representing at least one of: (i) the terrain characteristic, (ii) the topography characteristic, and (iii) the image of the surrounding terrain.

6. The method of claim 1, wherein the human cognizable medium includes a visual display.

7. The method of claim 6, wherein the visual display includes at least one of: (i) an eye piece, (ii) a visor, (iii) a set of binocular eyewear, and (iv) a vehicle projection display.

8. The method of claim 1, wherein communicating with the seismic device includes providing at least one of: (i) an instruction, (ii) a permission, (iii) a location of a mobile unit, (iv) a status, and (v) an attribute.

9. A system for conducting a seismic survey, comprising:
    a database configured to contain data associated with a survey plan, the data containing at least one coordinate associated with each of a plurality of seismic devices;
    a computer configured to access the database;
    a portable navigation tool configured to receive at least one coordinate for a selected set of seismic devices of the plurality of seismic devices from the computer and information relating to at least one of (i) a route restriction, and (ii) a hazard, wherein the portable navigation tool is further configured to communicate with at least one seismic device of the plurality of seismic devices using the portable navigation tool, wherein the communication is bi-directional;
    a device in the portable navigation tool that is configured to determine a location of the portable navigation tool;

a processor in the portable navigation tool that is configured to determine a navigation solution from the determined location to each seismic device in the set of devices; and a presentation device in communication with the portable navigation tool and configured to present the determined navigation solution in a human cognizable medium using the received at least one coordinate and the information relating to at least one of (i) the route restriction, and (ii) the hazard.

10. The system of claim 9, wherein the human cognizable medium includes a visual display.

11. The system of claim 10, wherein the visual display includes at least one of: (i) an eye piece, (ii) a visor, (iii) a set of binocular eyewear, and (iv) a vehicle projection display.

12. The system of claim 9, further comprising a source controller configured to communicate with the at least one seismic device to provide at least one of: (i) an instruction, (ii) a permission, (iii) a location of a mobile unit, (iv) a status, and (v) an attribute.

13. A system for conducting a seismic survey, comprising:
a substantially transparent screen configured to display information to a user, the screen not impairing visual contact with a terrain; and
a portable navigation tool configured to transmit the information to the screen for display to the user, the portable navigation tool being configured to:
store at least one coordinate for each of a selected set of seismic devices of the plurality of seismic devices from a computer;
determine a navigation solution to each seismic device in the set of devices using the stored coordinates;
communicate with each of the seismic devices, wherein the communication is bi-directional; and
to receive an adjusted at least one coordinate for each of the selected set of seismic devices.

14. The system of claim 13, wherein the portable navigation tool is further configured to store at least one of: (i) a terrain characteristic, (ii) a topography characteristic, and (iii) an image of a surrounding terrain.

15. The system of claim 13, wherein the transparent screen is at least one of: (i) an eye piece, (ii) a visor, (iii) a set of binocular eyewear, and (iv) a vehicle projection display.

16. The system of claim 13, wherein the portable navigation tool is further configured to store information relating to at least one of: (i) an obstacle, (ii) a boundary, (iii) a restriction, (iv) a hazard; (v) a constraint on acceptable movement of a mobile unit; (vi) a legal boundary associated with the terrain, and (vii) a preferred course for the mobile unit.

17. The system of claim 13, the information transmitted to the seismic devices includes at least one of: (i) an instruction, (ii) a permission, (iii) a location parameter, (iv) a status, and (v) an attribute.

* * * * *